United States Patent
Evans

(10) Patent No.: US 7,322,379 B2
(45) Date of Patent: Jan. 29, 2008

(54) FLEXIBLE KINK-RESISTANT HOSES

(76) Inventor: Daniel C. Evans, 87151 Kellmore St., Eugene, OR (US) 97402

( * ) Notice: Subject to any disclaimer, the term of this patent is extended or adjusted under 35 U.S.C. 154(b) by 0 days.

(21) Appl. No.: 11/053,591

(22) Filed: Feb. 7, 2005

(65) Prior Publication Data

US 2006/0174960 A1    Aug. 10, 2006

(51) Int. Cl.
*F16L 11/00* (2006.01)
(52) U.S. Cl. ............... 138/114; 138/121; 138/DIG. 11
(58) Field of Classification Search .......... 138/114, 138/121, 38, DIG. 11
See application file for complete search history.

(56) References Cited

U.S. PATENT DOCUMENTS

| | | | |
|---|---|---|---|
| 1,425,148 A | 8/1922 | Subers | |
| 2,420,221 A * | 5/1947 | Bell | 138/111 |
| 3,173,196 A * | 3/1965 | Grimm | 29/890.036 |
| 3,314,449 A * | 4/1967 | Krone et al. | 138/125 |
| 3,720,235 A | 3/1973 | Schrock | |
| 3,860,040 A * | 1/1975 | Sullivan | 138/124 |
| 3,866,632 A | 2/1975 | Schaffer | |
| 4,410,012 A | 10/1983 | Redding et al. | |
| 4,688,890 A | 8/1987 | DeMeo et al. | |
| 4,840,623 A * | 6/1989 | Quackenbush | 604/524 |
| 4,892,442 A * | 1/1990 | Shoffner | 405/183.5 |
| 5,027,864 A * | 7/1991 | Conti et al. | 138/177 |
| 5,048,572 A * | 9/1991 | Levine | 138/121 |
| 5,060,697 A | 10/1991 | Weinheimer | |
| 5,154,869 A | 10/1992 | Bergmann et al. | |
| 5,437,311 A * | 8/1995 | Reynolds | 138/115 |
| 5,682,925 A | 11/1997 | Seckel | |

* cited by examiner

*Primary Examiner*—James Hook
(74) *Attorney, Agent, or Firm*—Kolisch Hartwell, P.C.

(57) ABSTRACT

A flexible kink-resistant hose configuration includes concentric tubes with longitudinal ribs.

17 Claims, 2 Drawing Sheets

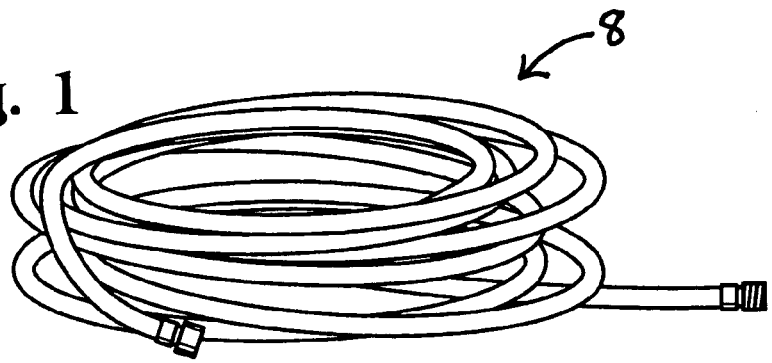
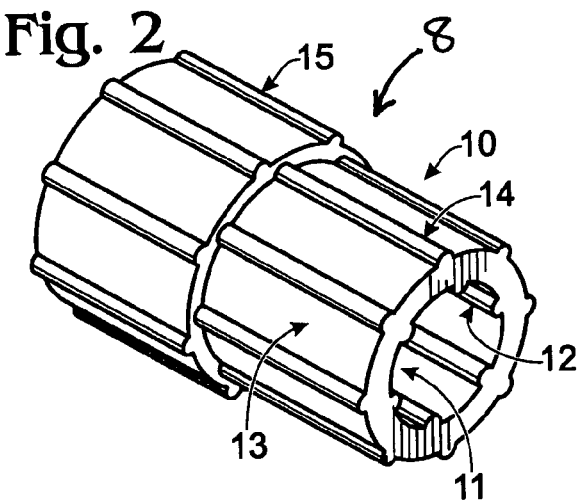
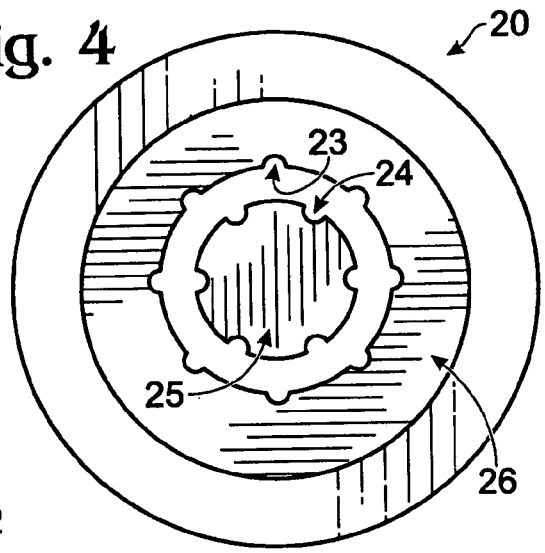
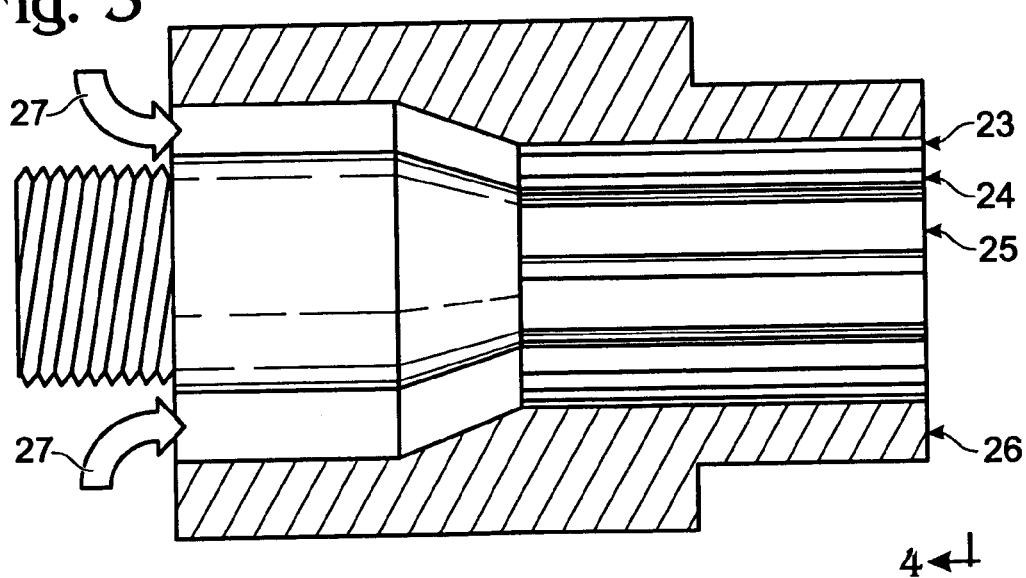

FLEXIBLE KINK-RESISTANT HOSES

FIELD OF THE INVENTION

The present invention relates to hoses, particularly, flexible hoses for conveying pressurized fluids.

BACKGROUND

Hoses are used in home and industry wherever water, air or other fluids are moved from one point to another. Kinking is a common problem with flexible hoses. A kink in a hose may impede or stop fluid flow and may require intervention to remove the kink. Kinking occurs wherever the hose becomes doubled over or twisted so the open cross-sectional area inside the hose becomes significantly reduced or closed. Removing a kink from a hose typically requires manually inspecting and manipulating the hose to restore flow. Where the hose is routed through an enclosed, inaccessible area, such as a building wall or car body, the process of remediation can be labor intensive and expensive.

One approach to resist kinking is to increase the thickness of the hose wall. However, this approach may render the hose too inflexible to thread through or around a desired path. It also may substantially increase the material cost of the hose. Fiber reinforcement of the hose wall may increase wall strength, but may not necessarily reduce kinking.

SUMMARY

A kink-resistant flexible hose for conveying pressurized fluid uses a combination of longitudinal ribs. Example configurations of the invention use various rib arrays formed in or around concentric tubes.

BRIEF DESCRIPTION OF DRAWINGS

FIG. 1 is a perspective view of a flexible hose.

FIG. 2 is a partial perspective cut-away view of the hose shown in FIG. 1 including an inner tube with a substantially circular cylindrical portion with spaced ribs on the inner surface and the outer surface and an outer tube contiguous with the inner tube, and conformed to the ribs and external surface of the inner tube.

FIG. 3 is a cross sectional view of the mandrel and die used to manufacture a tube with longitudinal ribs.

FIG. 4 is another cross sectional view of the die and mandrel shown in FIG. 3.

DETAILED DESCRIPTION

Figure 5:
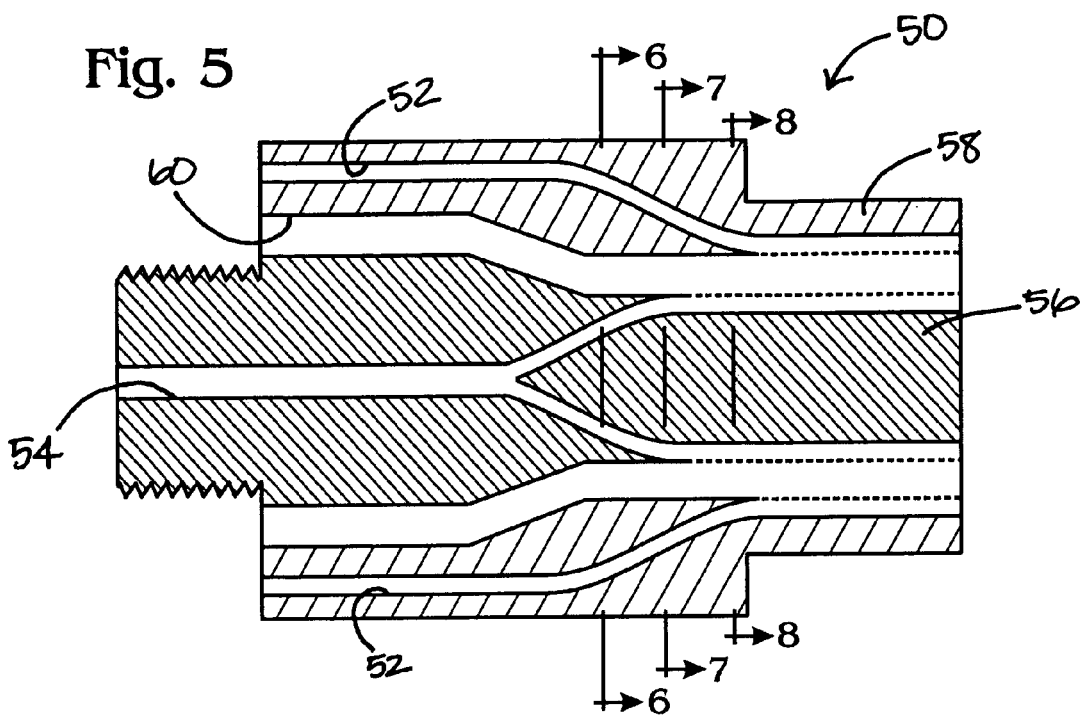
FIG. 5 is a cross-sectional view of a mandrel and die configuration for making an alternate hose embodiment.
Figure 6:
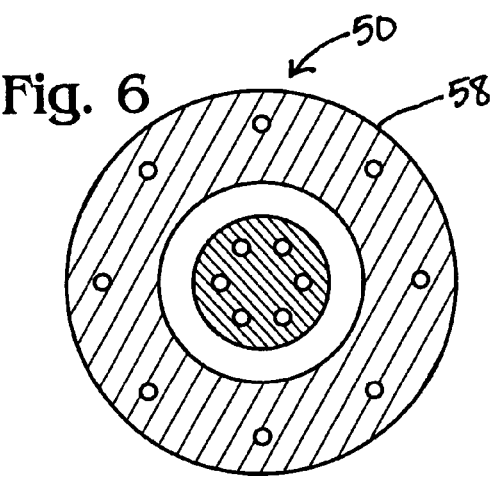
FIGS. 6-8 are various cross-sectional views through the mandrel and die configurations shown in FIG. 5.
Figure 7:
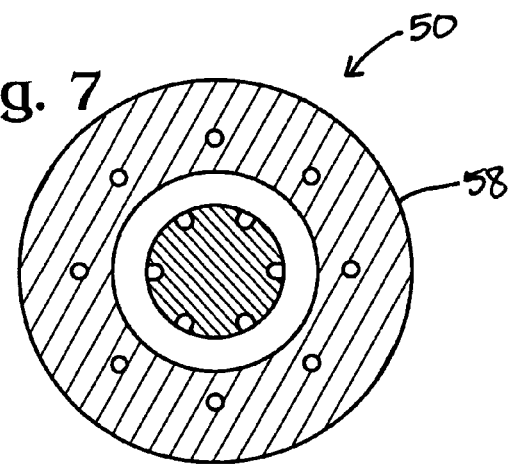
Figure 8:
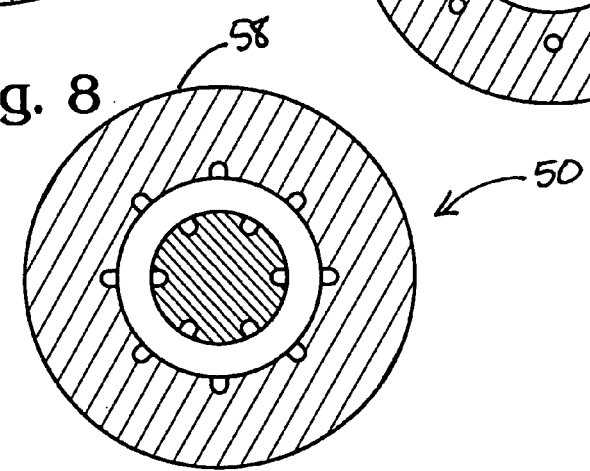

Flexible hose 8 is shown in FIG. 1. Hose 8 may be used, for example, as a garden hose, or as a fluid conduit for numerous other purposes. FIG. 2 shows a cross section of flexible hose 8. Inner tube 10 may be formed of a durable synthetic resin with an inner surface 11 and outer surface 13. Inner surface 11 has longitudinal ribs 12 circumferentially spaced either preferably evenly or randomly. Outer surface 13 of tube 10 has longitudinal ribs 14 circumferentially spaced evenly around tube 10. The height, width or shape of the ribs may be varied as desired provided certain flexural characteristics or physical properties are maintained. The ribs may be co-extruded with the tube or added to the inner tube in a separate process. The ribs may be made of the same material as the main tube or may be made of different material(s). Outer tube or cover 15 may be extruded over inner tube 10. Outer tube 15 may have external ribs or may be smooth. Outer tube 15 may be made of a different material than the ribs and/or inner tube.

The inner tube may be enclosed in a reinforcing fibrous member before the cover is extruded. Material such as greige polyester, nylon, Fiber B or Nomex by DuPont may be used as a fabric or strand reinforcement over the inner tube.

FIG. 3 shows a cross section of a mandrel and die whereby the inner tube is extruded in a screw type extrusion machine. The raw material is heated to above its melt temperature and fed into the die and mandrel through inlet 27. Inner mandrel 25 is attached to die 26. Mandrel 25 has grooves 24 to form ribs on the inside surface of inner tube 10. Die 26 has grooves 23 to form ribs on the outer surface of inner tube 10. FIG. 4 shows another cross section of mandrel 25 and die 26 used to manufacture a rib reinforced tube.

The tube formed with internal and external longitudinal ribs may be formed by extrusion of any suitable synthetic resin or plastic. A thermoplastic polyurethane is preferred for some applications. Other suitable resins may include nylon 11, ethylene vinyl acetate, polyethylene, polyvinyl chloride, synthetic rubbers, other similar materials, and mixtures thereof.

As an example, a hose of this type has been manufactured with an inside diameter at the inner tube inner surface of approximately 0.60". The ribs may be isosceles trapezoids in cross sectional shape with a height of approximately 0.050", a base of approximately 0.080" and a top of approximately 0.040". The wall thickness of the inner tube may be approximately 0.060" thick. The covering or outer tube may be approximately 0.060" from the outside surface of the inner tube to the outer surface of the outer tube. The rib spacing on the inner surface of the tube may be about 60 degrees as measured from the longitudinal axis of the tube. The rib spacing on the outer surface of the tube may be about 60 degrees as measured from the longitudinal axis of the tube.

In a different die and mandrel assembly 50 shown in FIG. 5, a different hose example may be made with ribs of different material in comparison to the material used for the main tube portion. Longitudinal ribs of a selected material are coextruded onto the inside and outside surfaces of the tube. The ribs melt bond to the surface of the main tube portion. The ribs may be formed by feeding the raw material through a conduit or passage 52 or 54 machined into the mandrel 56 and/or die 58. The passage through die 58 or mandrel 56 feeds directly to the grooves that form the outer surface ribs or inner surface ribs of the inner tube, as they are being extruded. Material to form the tube body may be fed through conduit 60 between mandrel 56 and die 58. The ribs of a different material are melt bonded onto the tube surface as it is extruded. The ribs may also be formed in a later operation after the tube is extruded.

The number of ribs and dimensions of the ribs may vary with the diameter of the inner tube. A larger diameter tube may have a larger number of circumferentially spaced ribs. When multiple ribs are used, they may be equally or randomly spaced without detracting from the intended advantages or scope of the invention.

The longitudinal ribs on the inner surface of the inner tube permit flow inside the tube even when kinked. When kinked, the hose is flattened so opposite faces of the tube are pressed together. In a hose with a smooth inside surface, these faces will make contact and form a seal that obstructs flow. The ribs on the inside surface of the tube prevent the faces of the inside surfaces of the tube from making contact. The ribs meet the opposite face of the tube first, and prevent the formation of a seal. The flow inside the tube is therefore maintained while the hose is kinked. The ribs also function to stiffen the hose to a desired extent so kinking is resisted, while still allowing an appropriate amount of flexibility in the hose. These objectives may be accomplished while maximizing efficient use of raw materials.

The continued flow through a partially occluded section maintains pressure through the length of the section which maintains a force opposite to the bending forces. The compressed ribs on the inside and outside surfaces of the inner tube also provide an opposing force to the bending force helping the hose to return to an unkinked position and open flow. By selecting the right materials a hose is produced which still has the flexibility to bend smoothly but is resistant to buckling or kinking. Interior and exterior ribs in a concentric tube design may provide stiffness equivalent to a smooth tube with additional wall thickness, which better resists kinking while requiring less raw material and a final product of less weight. Hoses constructed as described herein may exhibit superior abrasion and/or drag resistance compared to previous hoses.

Although the invention has been described in detail for the purpose of illustration, it is to be understood that such detail is solely for that purpose and that variations can be made therein by those skilled in the art without departing from the spirit and scope of the invention except as it may be limited by the claims.

Applicant regards the subject matter of his invention to include all novel and non-obviou combinations and subcombinations of the various elements, features, functions and/or properties disclosed herein. No single feature, function, element or property of the disclosed examples is essential to all examples. The following claims define certain combinations and subcombinations which are regarded as novel and non-obvious. Other combinations and subcombinations of features, functions, elements and/or properties may be claimed thru amendment of the present claims or presentation of new claims in this or a related application. Such claims, whether they are different, broader, narrower or equal in scope to the original claims are also regarded as included within the subject matter of applicant's invention.

I claim:

1. A flexible hose comprising
   an inner tube having an internal surface, an external surface and a substantially circular cylindrical portion,
   a first set of longitudinal ribs formed on the internal surface;
   a second set of longitudinal ribs formed on the external surface, and
   an outer concentric tube contiguous with the inner tube and conformed to the ribs and external surface of the inner tube.
2. The hose of claim 1, wherein the outer tube has grooves corresponding to the second set of ribs on the external surface of the inner tube.
3. The hose of claim 1, wherein the inner and outer tubes are made of different materials.
4. The hose of claim 1, wherein the inner tube is made of a polymeric material selected for properties providing a durable pressurized fluid flow interface.
5. The hose of claim 1, wherein the outer tube is made of a polymeric material selected for properties providing support for the inner tube and durability relative to an external environment where the hose may be used.
6. The hose of claim 1, wherein the first and second sets of ribs are off-set from each other.
7. The hose of claim 1, wherein the cover has an outer surface and a plurality of longitudinal ribs formed on the outer surface.
8. A hose for conducting a pressurized fluid comprising a plurality of concentric coextensive tubes including:
   at least one interface with a plurality of corresponding longitudinal ribs and grooves spaced around the at least one interface; and
   an inner tube with a substantially circular cylindrical portion and an inner surface with spaced apart longitudinal ribs.
9. The hose of claim 8, wherein the tubes include an inner tube and an outer tube.
10. The hose of claim 9, wherein the inner tube has a plurality of longitudinal ridges on an interior side.
11. The hose of claim 10, wherein the inner tube has 6 longitudinal ridges evenly spaced around the interior side.
12. The hose of claim 9, wherein the outer tube has an outer side and a plurality of longitudinal ribs on outer side of the outer tube.
13. The hose of claim 9, wherein the inner tube has a main body portion, the ribs being made of a different material from the main body portion.
14. The hose of claim 9, wherein the inner tube has a main body portion, the ribs and the main body portion being coextruded from the same material.
15. A hose for conveying water comprising:
   an inner tube including:
      portions of substantially constant inner and outer radius that define inner and outer surfaces; and
      ribs formed on the inner and outer surfaces; and
   an outer layer covering and conforming to the outer surface and ribs of the inner tube;
   wherein the ribs on the inner and outer surfaces of the inner tube are spaced at a distance greater than the width of a rib base.
16. The hose of claim 15 where the ribs are formed from a different material than the portions of the inner tube with substantially fixed inner and outer radius.
17. The hose of claim 15 where the outer layer includes an outer surface and the outer surface includes ribs on the surface.

* * * * *